United States Patent [19]

Suhara et al.

[11] 4,261,803

[45] Apr. 14, 1981

[54] ELECTROLYSIS OF AQUEOUS SOLUTION OF POTASSIUM CHLORIDE

[75] Inventors: Manabu Suhara; Yoshio Oda, both of Yokohama, Japan

[73] Assignee: Asahi Glass Company, Ltd., Tokyo, Japan

[21] Appl. No.: 93,437

[22] Filed: Nov. 13, 1979

[30] Foreign Application Priority Data

Nov. 10, 1978 [JP] Japan ............................... 53-137812

[51] Int. Cl.³ .................. C25B 1/16; C25B 1/26; C25B 13/08
[52] U.S. Cl. ..................................... 204/98; 204/128; 204/296
[58] Field of Search ..................... 204/98, 128, 296

[56] References Cited

U.S. PATENT DOCUMENTS

| 4,060,465 | 11/1977 | Yokota | 204/128 |
|---|---|---|---|
| 4,065,366 | 12/1977 | Oda | 204/128 |
| 4,118,308 | 10/1978 | Specht | 204/98 |
| 4,176,022 | 11/1979 | Darlington | 204/128 |
| 4,178,218 | 12/1979 | Seko | 204/128 |

FOREIGN PATENT DOCUMENTS 53-58995  5/1978  Japan .

Primary Examiner—T. M. Tufariello
Attorney, Agent, or Firm—Oblon, Fisher, Spivak, McClelland & Maier

[57] ABSTRACT

An electrolysis of an aqueous solution of potassium chloride is carried out by employing a fluorinated cation exchange membrane having an ion-exchange capacity of 0.8 to 2.0 meq/g dry polymer and having carboxylic acid groups as functional groups and maintaining a concentration of an aqueous solution of potassium hydroxide in a cathode compartment in a range of 20 to 45 wt. % and maintaining a calcium concentration in the aqueous solution of potassium chloride to lower than 0.05 mg/liter.

The purification of the aqueous solution of potassium chloride to reduce the calcium concentration is carried out in a system comprising a chelate ion-exchange substance.

6 Claims, 3 Drawing Figures

ELECTROLYSIS OF AQUEOUS SOLUTION OF POTASSIUM CHLORIDE

BACKGROUND OF THE INVENTION

1. Field of the Invention

The present invention relates to an electrolysis of an aqueous solution of potassium chloride. More particularly, it relates to an electrolysis of an aqueous solution of potassium chloride at low voltage, at high current efficiency and is stable for a long time so as to be satisfactory as an industrial process.

2. Description of the Prior Art

The ion-exchange membrane type electrolysis of potassium chloride which employs an ion-exchange membrane as a membrane, has been studied as a process for producing chlorine and potassium hydroxide of high purity which does not substantially contain potassium chloride.

However, an aqueous solution of potassium chloride is brought into contact through an ion-exchange membrane with an aqueous solution of potassium hydroxide having relatively high concentration in the ion-exchange membrane type electrolysis, whereby calcium ions and magnesium ions in the aqueous solution of potassium chloride, contact with hydroxyl ions in the ion-exchange membrane to produce insoluble hydroxides and to form fine precipitates. Accordingly, the formation of the precipitates causes serious problems such as the increase of electrolytic voltage and the decrease of current efficiency and the decrease of strength of the ion-exchange membrane and the deterioration of the structure of the membrane during the operation.

In order to overcome these difficulties, it is necessary to purify the aqueous solution of potassium chloride as the raw material fed to an anode compartment, to a higher degree than those of the electrolysis in the conventional mercury process or the asbestos diaphragm process.

The aqueous solution of potassium chloride fed in the conventional ion-exchange membrane process has more than about 0.1 to 0.5 mg/liter of soluble calcium concentration and 0.05 to 0.1 mg/liter of soluble magnesium as disclosed in Japanese Unexamined Patent Publication Nos. 58995/1978.

It has been considered to substantially overcome said difficulties by purifying it to said level.

However, the inventors have studied the fluorinated cation exchange membranes having carboxylic acid groups as functional groups which have been known as a high performance membrane in an electrolysis of an alkali metal compound. As a result, the inventors have found that the allowable soluble calcium concentration in an aqueous solution of potassium chloride for a stable electrolysis for a long time at low voltage and high current efficiency, so as to be satisfactory as an industrial process, should be lower than the proposed calcium concentration of the prior art though it depends upon ion-exchange capacity, and a concentration of an aqueous solution of sodium hydroxide in a cathode compartment.

That is, the inventors have studied the effect of small amounts of calcium component in an aqueous solution of potassium chloride under the conditions employing the fluorinated cation exchange membrane having an ion-exchange capacity of 0.8 to 2.0 meq/g dry polymer and having carboxylic groups as functional groups, and maintaining the concentration of the aqueous solution of potassium hydroxide in the cathode compartment in a range of 20 to 45 wt. % (See Experiment 1). As a result, the following new fact has been found.

In the case of the production of 40% aqueous solution of potassium hydroxide in the cathode compartment by an electrolysis of an aqueous solution of potassium chloride at a calcium concentration of 0.005 to 0.5 mg/liter, the $Ca^{++}$ precipitation velocity $(b)(\mu g/hour. cm^2)$ in the absorption of $Ca^{++}$ into the membrane was measured from the calcium content in the membrane during the electrolysis for definite times.

FIG. 1 shows the relation between the $Ca^{++}$ concentration (mg/l) in the aqueous solution of potassium chloride and the $Ca^{++}$ precipitation velocity $(\mu g/hour. cm^2)$.

As it is clearly understood from FIG. 1, the $Ca^{++}$ ion precipitation velocity is zero at the calcium concentration of 0.015 mg/liter.

Accordingly, when the calcium concentration in the aqueous solution of potassium chloride is lower than 0.015 mg/liter, calcium ion is not precipitated into the membrane whereby the accumulation of calcium component is not caused.

The critical soluble calcium concentration in the aqueous solution of potassium chloride is measured under varying the concentrations of the aqueous solution of potassium hydroxide in the cathode compartment. The result is shown in FIG. 2.

In accordance with these findings, the $Ca^{++}$ precipitation velocity to the cation exchange membrane is zero and the accumulation of calcium in the membrane is not caused when the calcium concentration in the aqueous solution of potassium chloride is kept lower than the critical calcium concentration shown in FIG. 2, in the production of potassium hydroxide at the specific concentration.

However, according to further studies by the inventors, it has been found that the deterioration of the electrochemical characteristics of the cation exchange membrane in the electrolysis of an aqueous solution of potassium chloride is not critically found during electrolysis of an aqueous solution of potassium chloride containing calcium component at higher than the critical calcium concentration and the accumulation of calcium component is gradually caused at calcium concentration in a range of slightly higher than the critical calcium concentration.

As a result, it has been found that the soluble calcium concentration in the aqueous solution of potassium chloride need not always be maintained lower than the critical calcium concentration but it can be slightly higher than the critical calcium concentration in order to maintain the life of the cation exchange membrane for longer than a half year preferably longer than one year which is required for the ion-exchange membrane employed in an industrial electrolysis.

Thus, the critical value curve becomes gradually flatter upon increasing the concentration of the resulting potassium hydroxide in the range of 20 to 45 wt. % as shown in FIG. 2 and the above-mentioned requirements may be satisfied when the calcium concentration is lower than 0.05 mg/liter as the allowable calcium concentration.

It is preferable for longevity of cation exchange membrane to decrease the calcium content in the aqueous solution of potassium chloride whereas the load on the purification system for removing calcium components is increased. The discovery of the fact that the calcium content in the aqueous solution of potassium chloride can be higher than the critical calcium concentration in the invention is important for industrial operations because the load on the purification system can be mitigated.

SUMMARY OF THE INVENTION

It is an object of the present invention to provide an electrolysis of an aqueous solution of potassium chloride at low voltage, at high current efficiency and which remains stable for a long period in industrial operation while mitigating the need for purification of the aqueous solution of potassium chloride.

The foregoing and other objects of the present invention have been attained by providing an electrolysis of an aqueous solution of potassium chloride by employing a fluorinated cation exchange membrane having an ion-exchange capacity of 0.8 to 2.0 meq/g dry polymer and having carboxylic groups as functional groups and maintaining the concentration of an aqueous solution of potassium hydroxide in the cathode compartment in a range of 20 to 45 wt % and maintaining the calcium concentration in the aqueous solution of potassium chloride at lower than 0.05 mg/liter.

In accordance with the electrolysis of the present invention by controlling the calcium concentration in the aqueous solution of potassium chloride in said range, the precipitation or accumulation of calcium component in the cation exchange membrane is substantially minimized to attain the electrolysis of an aqueous solution of potassium chloride to produce potassium hydroxide at a concentration of 20 to 45 wt. %, without the increase of resistance of the membrane, the decrease of current efficiency and the deterioration of mechanical strength of the membrane for longer than a half year especially longer than one year which is required for the industrial operation.

DETAILED DESCRIPTION OF THE PREFERRED EMBODIMENTS

Figure 1:
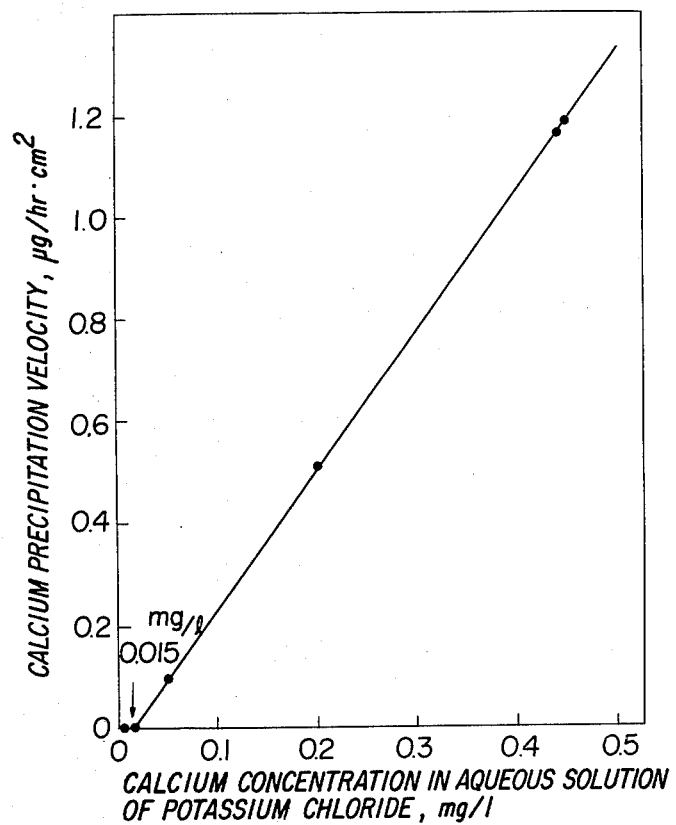
FIG. 1 shows the relation between the calcium concentration (mg/liter) in an aqueous solution of potassium chloride as a feed and the calcium precipitation velocity ($\mu$g/hour. cm$^2$).

The purification of an aqueous solution of potassium chloride to reduce the calcium concentration to said range is preferably carried out by contacting the aqueous solution of potassium chloride with the chelate ion-exchange substance, whereby the calcium component can be effectively removed to control the calcium concentration to said range and the other impurities such as magnesium ions (Mg$^{++}$) which form insoluble materials are also removed from the aqueous solution of potassium chloride.

Suitable chelate ion-exchange substances are resins capable of forming an intramolecular complex with calcium and magnesium which contains functional groups $>$N—CH$_2$COO$^-$. Preferable resins are styrenedivinyl benzene copolymer, styrene-butadiene copolymer, epichlorohydrin polymer, N-phenyl-glycine-glycidyl methacrylate copolymer.

Another type is suitable chelate ion-exchange substance is adsorbent solid supporting chelate substances capable of forming an intramolecular complex with calcium and magnesium which contain functional group $>$N—CH$_2$COO$^-$. Preferable chelate substances of this type include ethylene-diamine tetraacetic acid, trimethylenediaminetetraacetic acid, iminodiacetic acid, aminomethyl phosphonic diacetic acid or oligomers or alkali salts thereof.

Of course, it is possible to use the other chelate substances capable of forming an intramolecular complex with calcium ion and magnesium ion.

The chelate substances can be used by supporting on an adsorbent solid such as active carbon, coal, silica gel, and zeolite.

An amount of the chelate substance and a time for contacting the chelate substance with the KCl aq. sol. are selected so as to control the calcium concentration in the KCl aq. sol.

For example, the KCl aq. sol. is preferably fed into the chelate substance layer at a space velocity of 2 to 50 hr$^{-1}$.

The purification of the KCl aq. sol., can be also carried out as a pretreatment for the method of using the chelate substance, by adding a base such as an alkali metal hydroxide and an alkali metal carbonate to the KCl aq. sol. to precipitate and to separate calcium and magnesium components as hydroxides or carbonates.

Thus, 15 to 35 wt. % of the aqueous solution of potassium chloride is in said range, the satisfactory result as the industrial process can be attained.

When the calcium concentration is lowered to said range by contacting with a chelate ion exchange substance, the magnesium concentration in aqueous solution of potassium chloride can be reduced to lower than 0.01 mg/liter, preferably 0.03 mg/liter which does not adversely affect to the electrolysis.

Further, it is preferable to remove another impurity in aqueous solution of potassium chloride. Impurity such as silicon dioxide is reduced to lower than 1.0 mg/liter.

In order to expect excellent effect and to completely prevent the adverse effect caused by the absorption of calcium component, the calcium concentration is preferably lower than 0.02 mg/liter especially lower than the critical calcium concentration depending upon the concentration of the purified aqueous solution of potassium hydroxide in the cathode compartment.

On the other hand, from the industrial viewpoint it is not preferable to reduce the calcium concentration in the purified aqueous solution of potassium chloride to lower concentration especially excessively lower than the critical calcium concentration, because the load for purification with the chelate substance is remarkably increased.

Under the consideration of the costs of equipment and operation in the purification system, the calcium concentration in the purified aqueous solution of potassium chloride is preferably more than 1/50, especially more than 1/10 of the critical calcium concentration.

The calcium concentration and the magnesium concentration in the aqueous solution of potassium chloride used in the specification mean calcium and magnesium components dissolved in the aqueous solution of potassium chloride as ions and do not include insoluble salts thereof.

The fluorinated cation exchange membrane having an ion-exchange capacity of 0.8 to 2.0 meq/g dry polymer and having carboxylic acid groups as functional groups is employed in the electrolysis of the present invention.

When the functional groups are not carboxylic acid groups but sulfonic acid groups, or the ion-exchange capacity is out of said range, the allowable calcium concentration in the aqueous solution of potassium chloride is different and potassium hydroxide having high concentration of 20 to 45 wt. % may not be obtained with high current efficiency.

The term carboxylic acid groups in the present invention mean the groups such as —COOH and —COOM (M is defined below) which can be dissociated to COO⁻ under the condition in the electrolysis. The ion-exchange capacity is preferably in a range of 1.2 to 1.7 meq/g dry polymer.

Various fluorinated polymers can be used for preparing the fluorinated cation exchange membrane. The optimum fluorinated polymers are copolymers produced by copolymerizing a fluoroolefin monomer and a comonomer having carboxylic acid group or the other functional group which can be converted to carboxylic acid group.

It is especially preferable to use monomers for forming the following units (a) and (b) in the copolymer.

wherein
X represents fluorine, chlorine or hydrogen atom or —CF₃;
X' represents X or CF₃(CF₂)$_m$—;
m represents an integer of 1 to 5 and
Y represents

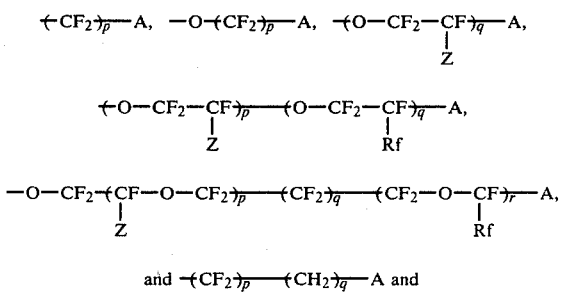

p, q and r respectively represent an integer of 1 to 10;
Z and Rf represent —F or a $C_1$-$C_{10}$ perfluoroalkyl group;
A represents —COOH, —COOM or —CN, —COF, —COOR₁,

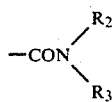

as a functional group which can be converted to carboxylic acid group by a hydrolysis or a neutralization;
R₁ represents a $C_1$-$C_{10}$ alkyl group; M represents an alkali metal or a quaternary ammonium group;
R₂ and R₃ respectively represent a $C_1$-$C_{10}$ alkyl group.

In the case of the copolymers having the units (a) and (b), the ratio of the units (b) to the units (a) in the copolymer is selected so as to give said ion-exchange capacity.

In the preparation of the fluorinated copolymers, one or more monomers for forming the units (a) and the units (b) are used. It is also possible to improve the mechanical strength of the membrane by combining one or more other monomer such as divinyl monomer e.g. CF₂=CFORf, CF₂=CF—CF=CF₂ and CF₂=CFO(CF₂)₁₋₄OCF=CF₂ wherein Rf represents a $C_1$-$C_{10}$ perfluoroalkyl group to crosslink the copolymer.

The fluorinated cation exchange membrane should be non-porous membrane because it should not substantially pass an electrolyte and selectively pass only specific ions as the characteristics of the ion-exchange membrane.

The thickness of the membrane is preferably 20 to 1000 microns especially 50 to 500 microns.

When the functional groups of the fluorinated cation exchange membrane are groups which can be converted to carboxylic acid groups, the functional groups can be converted to carboxylic acid groups (COOM) by suitable treatment depending upon the functional groups before the membrane is used in electrolysis.

When the functional groups are —CN, —COF, —COOR₁, —CONR₂R₃ (R₁ to R₃ are defined above), the functional groups can be converted to carboxylic acid groups (COOM) by hydrolysis or neutralization with an acid or an alcoholic aqueous solution of a base.

The another fluorinated cation exchange membranes having carboxylic acid groups as the functional groups used in the electrolysis of the present invention can be prepared by fabricating a fluorinated cation exchange membrane having the other functional groups and converting the functional groups to carboxylic acid groups. For example, the cation exchange membrane of a copolymer of a fluoroolefin such as tetrafluoroolefin and a fluorocarbon vinyl ether having functional groups of —SO₂L(L: Hydroxyl group or a halogen atom) such as perfluoro [2-(2-fluorosulfonyl ethoxy)-propylvinyl ether] is treated with a reducing agent to convert the functional groups to carboxylic acid groups, as disclosed in Japanese Unexamined Patent Publication No. 122677/1976; No. 24176/1977 and No. 24177/1977.

The known ion-exchange membrane process can be employed as the process for the electrolysis of the aqueous solution of potassium chloride. For example, the electrolytic voltage is preferably in a range of 2.3 to 5.5 volts and the current density is preferably in a range of 5 to 100 A/dm².

The anode used in the electrolysis can be graphite or anticorrosive electrode having stability in size which is made of a titanium substrate coated with a platinum group metal or an oxide of platinum group metal. The system of the electrolytic cell can be the monopolar system or the bipolar system.

Thus, in the case of the two compartment cell wherein the anode compartment and the cathode compartment are formed by partitioning the anode and the cathode with the cation exchange membrane and an aqueous solution of potassium chloride is fed in the anode compartment to electrolyze it and to obtain an aqueous solution of potassium hydroxide from the cathode compartment, it is possible to obtain the aqueous solution of potassium hydroxide having a concentration of 20 to 45%, especially 25 to 43% at low electrolytic voltage and high current efficiency without a substantial deterioration of the membrane for a long time by the electrolysis at 40° to 120° C., preferably 70° to 95° C. in the current density of 10 to 60 A/dm² with the raw material of the aqueous solution of potassium chloride having a concentration of higher than 1.5 normal.

The present invention will be further illustrated by certain specific examples, which are included for purposes of illustration only and are not intended to be limiting unless otherwise specified.

In the examples, an ion-exchange capacity of a cation exchange membrane is defined as follows.

A cation exchange membrane was immersed into 1 N-HCl at 60° C. for 5 hours to completely convert it to H-type membrane, and then, the membrane was washed with water so as to be free of HCl.

Then, 0.5 g of the H-type membrane was immersed into 25 ml of 0.1 N—NaOH to completely convert it to the Na⁺ type membrane. Then, the membrane was taken out and the amount of NaOH in the solution was measured by a back titration with 0.1 N—HCl.

In the examples, the quantitative analysis of small amounts of calcium component and magnesium component in an aqueous solution of potassium chloride and an aqueous solution of potassium hydroxide are carried out as follows.

In the case of the aqueous solution of potassium chloride, hydrochloric acid was added and the mixture was heated to distill off the acidic components. In the case of the aqueous solution of potassium hydroxide, potassium hydroxide was neutralized to form potassium chloride.

Then, calcium component and magnesium component in the aqueous solution of potassium chloride were absorbed by using $H^{30}$ type chelate substance. The chelate substance was separated and the calcium component and the magnesium component absorbed in the chelate substance was desorbed with a small amount of hydrochloric acid. The calcium concentration and the magnesium concentration were quantitatively analyzed by the atomic absorption spectroscopy.

EXAMPLE 1

A 3.5 N—KCl/aqueous solution containing 3 mg/liter of calcium component and 0.5 mg/liter of magnesium component was fed into a tower filled with a chelate resin of styrene-divinylbenzene copolymer having iminodiacetatic acid groups as the functional groups (diameter 297 to 1190μ) (Diaion CR-10 manufactured by Mitsubishi Chemical Ind. Ltd.) at a rate of 2000 liter KCl aq. sol./liter wet chelate resin at a space velocity of 25 hr⁻¹ at 60° C. whereby the purified KCl aqueous solution containing 0.008 mg/liter (±0.001 mg/liter) of calcium component and 0.001 mg/liter (±0.0003 mg/liter) of the magnesium component was obtained.

On the other hand, a fluorinated cation exchange membrane made of a hydrolyzed copolymer of tetrafluoroethylene and methyl perfluoro-5-oxa-6-heptenoate which had an ion-exchange capacity of 1.46 meq./g dry polymer and thickness of 300μ, and Pt-Ir alloy coated titanium expand metal as the anode and a stainless steel expand metal as the cathode were assembled to form an electrolytic cell having an electrode space of 5 mm and an effective area of the membrane of 25 cm².

An electrolysis was carried out at 90° C. and the current density of 20 A/dm² under maintaining the concentration of potassium hydroxide in the cathode compartment to 40 wt. % by feeding the purified 3.5 N—KCl aqueous solution (pH=7.0) into the anode compartment and feeding water into the cathode compartment under controlling the feed rates of them.

On the other hand, the calcium concentration in the KCl aqueous solution was varied by adding calcium chloride to the purified KCl aqueous solution and the variation of the Ca⁺⁺ precipitation velocity for precipitating the calcium component in the membrane (μg/hour.cm²) was measured. The results are shown in FIG. 1.

The Ca⁺⁺ precipitation velocity for precipitating calcium component in the membrane was measured from the flow rate of the charged KCl aqueous solution [liter/hour] the flow rate of the discharged KCl aqueous solution [liter/hour] and the flow rate of the resulting KOH liter/hour and the calcium concentrations in said solutions.

It was confirmed that the resulting precipitation velocity was the same with the precipitation velocity obtained by measuring the calcium component accumulated in the membrane after the electrolysis.

As it is clearly understood from the linearity of the Ca⁺⁺ absorption velocity in FIG. 1, the calcium concentration in the KCl aqueous solution which causes the precipitation of the calcium component in the cation exchange membrane was 0.015 mg/liter.

Thus, when the calcium concentration in the KCl aqueous solution was 0.008 mg/liter, the most of Ca⁺⁺ ions were passed through the membrane and the accumulation of the calcium component was not caused.

On the other hand, when the calcium concentration in the KCl aqueous solution was 0.10 mg/liter, the accumulation of Ca⁺⁺ in the membrane was caused.

The distribution of the calcium component in the sectional part of the membrane used for the electrolysis of the KCl aqueous solution having a calcium concentration of 0.10 mg/liter for 30 days was observed by a scanning type X-ray microanalyzer.

As a result of the observation, it was found that the calcium hydroxide depositing layer having a thickness 10 to 30μ was formed at the cathode side of the membrane.

Moreover, the sectional part of the membrane used for the electrolysis of the KCl aqueous solution having a calcium concentration of 5 mg/liter for 40 days was observed. As a result of the observation, it was found that the structure of the membrane was expanded by the particles of calcium hydroxide and the mechanical strength of the membrane was remarkably decreased.

Figure 2:
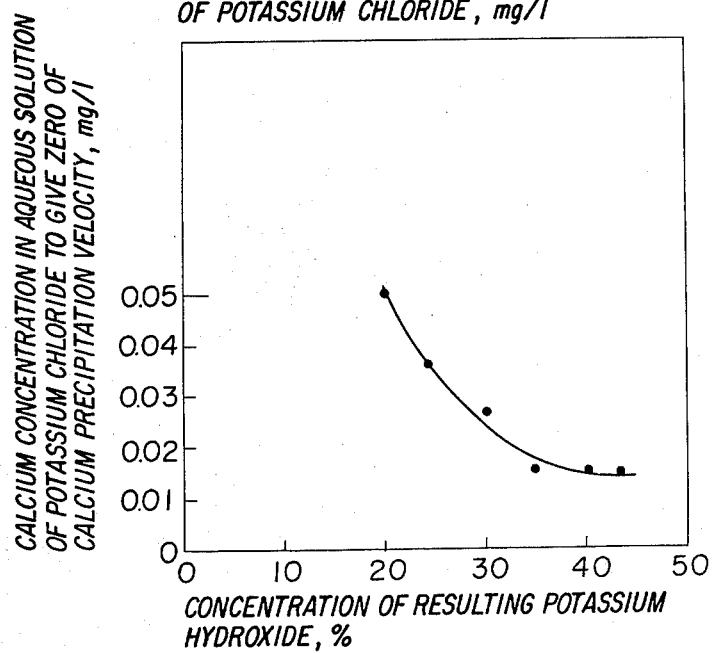
FIG. 2 shows the relation between the concentration of the resulting potassium hydroxide (%) and the calcium concentration in an aqueous solution of potassium chloride (mg/liter) to give zero of the calcium precipitation velocity.

The concentration of potassium hydroxide was varied in a range of 20 to 45 wt. %, and the critical calcium concentration in the KCl aqueous solution to give zero of the Ca⁺⁺ precipitation velocity for precipitating the calcium component to the membrane was measured. The results are shown in FIG. 2.

On the other hand, magnesium chloride was added to a purified aqueous solution of potassium chloride having a calcium concentration of 0.008 mg/liter and a magnesium concentration of 0.001 mg/liter and a magnesium concentration of 0.001 mg/liter and the relation of the magnesium concentration and the magnesium precipitation velocity was measured. The results are shown in FIG. 3.

Figure 3:
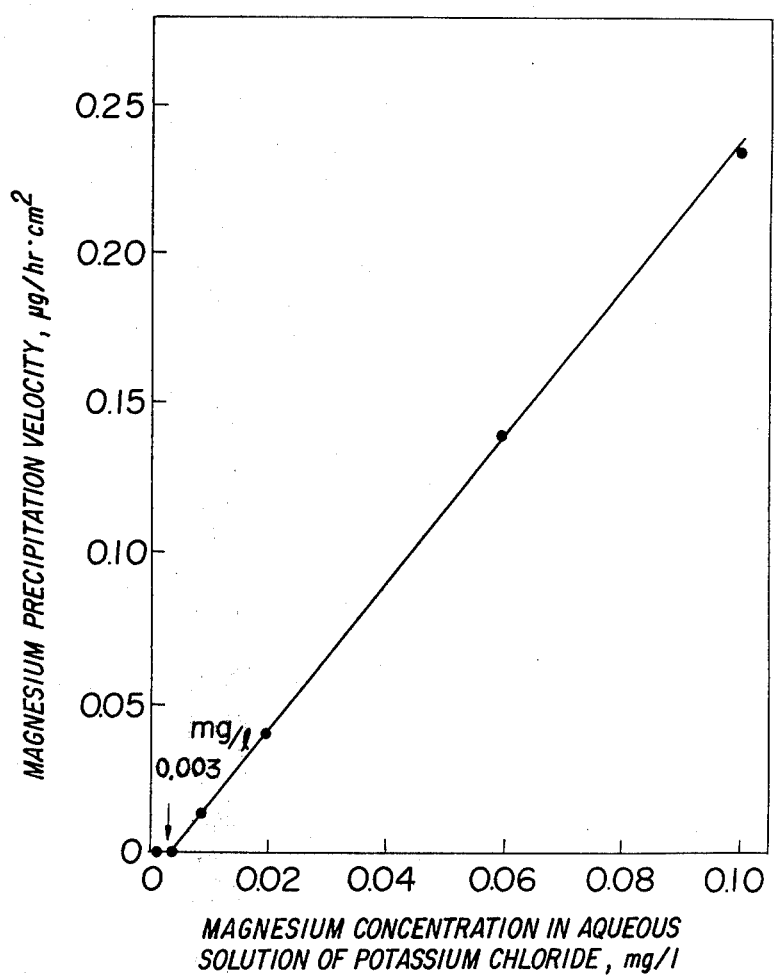
FIG. 3 shows the relation between the magnesium concentration in the aqueous solution of potassium chloride (mg/liter) and the magnesium precipitation velocity.

In FIG. 3, the magnesium concentration in the KCl aqueous solution to give zero magnesium precipitation velocity was 0.003 mg/liter.

EXAMPLES 2 TO 5 AND REFERENCES 1 TO 3

In accordance with the process of Example 1, except varying the calcium concentration in the KCl aqueous solution, each electrolysis was carried out for an extended period of time. The results are shown in Table 1.

TABLE 1

| Example & Reference | Example | | | | Reference | | |
|---|---|---|---|---|---|---|---|
| | 2 | 3 | 4 | 5 | 1 | 2 | 3 |
| Calcium concentration (mg/liter) | 0.008 | 0.010 | 0.010 | 0.020 | 0.5 | 0.4 | 0.5 |
| KOH concentration (%) | 40 | 35 | 35 | 30 | 40 | 35 | 30 |
| Concentration of anolyte (N) | 2.3 | 2.3 | 2.3 | 2.3 | 2.3 | 2.3 | 2.3 |
| Current density(A/dm$^2$) | 20 | 20 | 40 | 20 | 20 | 40 | 20 |
| Current efficiency(%) | | | | | | | |
| 10 days | 98 | 97 | 98 | 96 | 98 | 96 | 96 |
| 30 days | 98 | 98 | 97 | 96 | 97 | 92 | 95 |
| 60 days | 97 | 97 | 97 | 96 | 94 | 98 | 93 |
| 180 days | 95 | 97 | 97 | 96 | 90 | | 90 |
| 360 days | 94 | 96 | 96 | 96 | | | |
| 550 days | 94 | 95 | 95 | 96 | | | |

In the examples, the magnesium concentration in the KCl aqueous solution was lower than 0.002±0.003 mg/liter.

In Examples 3 to 5, no substantial rise of the cell voltage was found after 360 day or 550 days. On the contrary, in References 1 to 3, the rise of the cell voltage for 0.1 to 0.5 volt was found after 60 to 180 days.

EXAMPLES 6 AND 7 AND REFERENCES 4 AND 5

In accordance with the process of Example 1 except employing a fluorinated cation exchange membrane made of a hydrolyzed copolymer of tetrafluoroethylene, $CF_2=CFOCF_2CF(CF_3)O(CF_2)_3COOCH_3$ and $CF_2=CFO(CF_2)_3COOCH_3$ having an ion-exchange capacity of 1.23 meq/g dry polymer and varying the condition passing through the chelate resin layer to vary the calcium concentration in the KCl aqueous solution, each electrolysis was carried out for an extended period. The results are shown in Table 2.

TABLE 2

| Example & Reference | Example | | Reference | |
|---|---|---|---|---|
| | 6 | 7 | 4 | 5 |
| Calcium concentration (mg/liter) | 0.009 | 0.006 | 0.15 | 0.19 |
| KOH concentration (%) | 25 | 30 | 25 | 30 |
| Concentration of anolyte (N) | 2.3 | 2.3 | 2.3 | 2.3 |
| Current density (A/cm$^2$) | 20 | 20 | 20 | 20 |
| Current efficiency (%) | | | | |
| 10 days | 95 | 96 | 95 | 97 |
| 30 days | 95 | 97 | 94 | 96 |
| 60 days | 95 | 97 | 93 | 93 |

TABLE 2-continued

| Example & Reference | Example | | Reference | |
|---|---|---|---|---|
| | 6 | 7 | 4 | 5 |
| 182 days | 95 | 97 | 92 | 91 |
| 360 days | 95 | 96 | 90 | 87 |
| 550 days | | 96 | 88 | |

REFERENCES 6 AND 7

In accordance with the phocesses of Example 3 and Example 7 except adding magnesium chloride to the purified KCl aqueous solution, each electrolysis for durability test was carried out. The results are as follows.

TABLE 3

| Reference | Ref. 6 | Ref. 7 |
|---|---|---|
| Concentration of impurities in KCl aq. sol. | | |
| Mg$^{++}$ mg/liter | 0.10 | 0.10 |
| Ca$^{++}$ mg/liter | 0.008 | 0.008 |
| KOH concentration (%) | 35 | 30 |
| Concentration of anolyte (N) | 2.3 | 2.3 |
| Current density(A/dm$^2$) | 20 | 20 |
| Current efficiency | | |
| 10 days | 97 | 96 |
| 30 days | 96 | 96 |
| 60 days | 93 | 93 |
| 180 days | 91 | 91 |

What is claimed is:

1. In a process of producing potassium hydroxide by electrolysis of an aqueous solution of potassium chloride utilizing a fluorinated cation exchange membrane having an ion-exchange capacity of 0.8 to 2.0 meq/g dry polymer and having carboxylic acid groups as functional groups comprised of a copolymer having units (a) of $+CF_2-CXX'+$ and units (b) of $+CF_2-CX+$
                                              $|$
                                              $Y$ wherein
X represents fluorine, chlorine or hydrogen atom or $-CF_3$;
X' represents X or $CF_3(CF_2)_m-$; m represents an integer of 1 to 5 and
Y represents

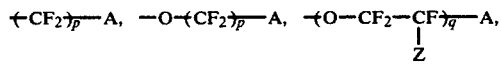

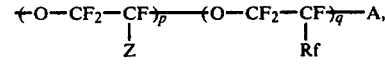

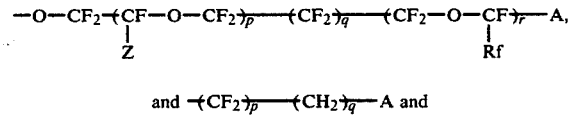

and $+CF_2)_p-(CH_2)_q-A$ and p, q and r respectively represent an integer of 1 to 10;
Z and Rf represents $-F$ or a $C_1-C_{10}$ perfluoroalkyl group;
A represents $-COOH$, $-COOM$ or $-CN$, $-COF$, $-COOR_1$,

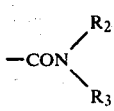

as a functional group which can be converted to carboxylic acid group by a hydrolysis or a neutralization;

$R_1$ represents a $C_1$–$C_{10}$ alkyl group;

M represents an alkali metal or a quaternary ammonium group;

$R_2$ and $R_3$ respectively represent a $C_1$–$C_{10}$ alkyl group and maintaining a potassium hydroxide concentration of from about 20 to about 45 weight % in the aqueous solution in the cathode compartment, in the improvement comprising maintaining said aqueous potassium chloride solution a calcium concentration lower than 0.05 mg/liter and a magnesium concentration lower than 0.03 mg/liter.

2. A process according to claim 1 wherein the copolymer is prepared by copolymerizing a monomer having the formula $CF_2=CXX'$ and a monomer having the formula $CF_2=CXY$ (wherein X, X' and Y are defined in claim 1.).

3. A process according to claim 1 wherein the calcium concentration in the aqueous solution of potassium chloride is maintained to lower than 0.05 mg/liter by passing the aqueous solution through a chelate ion-exchange tower.

4. A process according to claim 1 wherein the magnesium concentration in the aqueous solution of potassium chloride is lower than 0.01 mg/liter.

5. A process according to claim 1 wherein a calcium concentration in the aqueous solution of potassium chloride is maintained in a range of 0.001 to 0.05 mg/liter and a magnesium concentration is maintained in a range of 0.0005 to 0.01 mg/liter.

6. A process according to any of claims 3, 4 or 5 wherein the aqueous solution of potassium chloride is passed through a chelate ion exchange substance layer so as to maintain the calcium concentration and the magnesium concentration in said range.

* * * * *